United States Patent [19]

Loveless

[11] Patent Number: 4,672,653

[45] Date of Patent: Jun. 9, 1987

[54] REMOTE SECURITY SYSTEM

[76] Inventor: John H. Loveless, 2566 Salem Bottom Rd., Westminster, Md. 21157

[21] Appl. No.: 819,065

[22] Filed: Jan. 15, 1986

[51] Int. Cl.$^4$ ............................................ H04M 11/04
[52] U.S. Cl. ...................................... 379/39; 379/40; 379/44; 379/42
[58] Field of Search .............. 179/2 A, 2 R, 5 R, 5 P; 379/39, 40, 44, 42, 106

[56] References Cited

U.S. PATENT DOCUMENTS

| | | | |
|---|---|---|---|
| 4,086,434 | 4/1978 | Bocchi | 179/5 R X |
| 4,486,625 | 12/1984 | Reinaver et al. | 179/5 R X |
| 4,491,690 | 1/1985 | Daley | 179/2 A |
| 4,493,947 | 1/1985 | Loveless | 179/2 A |
| 4,528,423 | 7/1985 | James et al. | 179/2 A |
| 4,540,851 | 9/1985 | Hashimoto | 179/2 A |
| 4,571,455 | 2/1986 | Labock et al. | 179/2 A |
| 4,596,900 | 6/1986 | Jackson | 179/2 A |

*Primary Examiner*—James L. Dwyer

[57] ABSTRACT

The invention concerns a remote security and operating system. A user can dial remote systems for spot checks of system sensors, or different systems can dial the user on fault detection. Once the user is connected with the system, the user enters a code and command signals. For instance, a set of normally open sensor switches can be shut down, while a set of normally closed switches are monitored. Each system identifies itself to the user by a series of tonal bursts. The user, by pressing a telephone push-botton, can enter a new telephone number the system will call on fault detection. A set of remote microphones can be activated, their audio signals being fed to the user, through nulling amplifiers which the system would otherwise try to interpret. A tonal OK circuit signal is sent to the user upon testing if the system is working, followed by a different tone if a selected sensor switch detects a fault. An ultrasonic circuit operates a home lighting system through huse wiring, to light a user's home from outside once intrusion sensors are checked, for instance.

12 Claims, 3 Drawing Figures

REMOTE SECURITY SYSTEM

BACKGROUND OF THE INVENTION

The invention concerns a remote security and operating system that communicates with a system user over standard telephone lines.

Various devices have been proposed for monitoring and controlling equipment from remote locations, such as the irrigation system discussed in U.S. Pat. No. 4,095,050 to Beachem et al. The irrigation system is dialed from a remote telephone and gives a status of system sensors to the user. After using a code, punched on a push-button telephone and verification of the code by the system, elements of the system may be started or stopped. The disadvantages of this system are explained in U.S. Pat. No. 4,493,947 to Loveless.

U.S. Pat. No. 4,493,947 to Loveless discusses a security device using conventional telephone lines. Sensor faults are determined and an automatic call-up circuit dials a selected telephone number to report sensor faults. A deceiver ring signal is generated whenever a remote telephone is used to dial the system, which ceases when a security code is entered. To change the selected telephone number, the device operator must travel to the security device and reset switches. The device is physically connected to telephone lines and requires two push-button telephones. An identification circuit uses different frequencies to indicate where separate devices are located, requiring a tone decoder at the operator's remote telephone. Also, the device has no provision for stopping the scanning of sensors once a call-up has been received by the device operator.

U.S. Pat. No. 4,371,751 to Hilligross, Jr. et al. deals with an automatic telephonic apparatus including a base station and a remote unit. The base station automatically dials a plurality of telephone numbers upon detecting emergency conditions, and them transmits an aural message. A 16 digit keyboard of the base station is pushed to input telephone numbers to be called. The base station receives emergency signals from local external alarms or the remote units which transmit RF signals to the base station in response to appropriate stimulation. The operator cannot dial the apparatus to check conditions, but must wait until the apparatus calls. No calls by the apparatus might indicate all conditions are acceptable, but could mean the apparatus is not working. The operator would never know.

U.S. Pat. No. 4,121,053 to Dick involves a telephone command apparatus with an access device responsive to decoded signals representing a correct sequence of two-tone signals. Subsequent two-tone signals condition an oscillator to generate audible signals of different frequency, indicating the on-off status of a selected operation.

Blouch's U.S. Pat. No. 3,829,616 shows a ringer blocking attachment for a telephone. A simulated ring is heard by a dialing party, while the called party hears nothing. The dialing party must enter a set code before the called party hears a ring.

U.S. Pat. No. 4,284,849 to Anderson et al. concerns a monitoring and signaling system. A remote unit regularly telephones a center and delivers data representing a count of times a sensor has monitored an activity and produced signals, or telephones anytime a signal is not received from a sensor within a set period.

SUMMARY OF THE INVENTION

The invention concerns a remote security system that permits remote setting (e.g. from a user's home) of a telephone number the system is to call on failure detection by any system sensor, eliminating the need for a physically set, digital switch on-site (e.g. on a users boat or warehouse). A pulse dialer is used in the system so two push-button telephones are not required, as with other devices. An identifying circuit uses a tonal count or series of beeps to inform a user which system station is calling. For instance, two beeps may indicate a boat and three beeps a warehouse. As a result, a tone frequency detector is not required at the user's telephone, permitting the combination of an answering circuit in the identifying mode. A tone generator is used that generates AT&T designated tones, such as the ring signal. Once a sensor failure has been acknowledged by the user, the user shuts down the scanning of sensors to let the user determine which sensor has detected a failure. For instance, the scanning of normally open circuits (e.g., a bilge pump sensor) may be ceased, while the scanning of normally closed circuits (e.g., intrusion sensors) may be continued.

An optical switch and transformer isolate the system from the standard telephone lines to comply with regulations of the Federal Communications Commission. The system also includes microphones which permit a system user to listen for noises, such as sounds or voices of unauthorized persons who are within the system's perimeter. A nulling amplifier circuit insures that these noises do not trigger the system call features.

DETAILED DESCRIPTION

Figure 1:
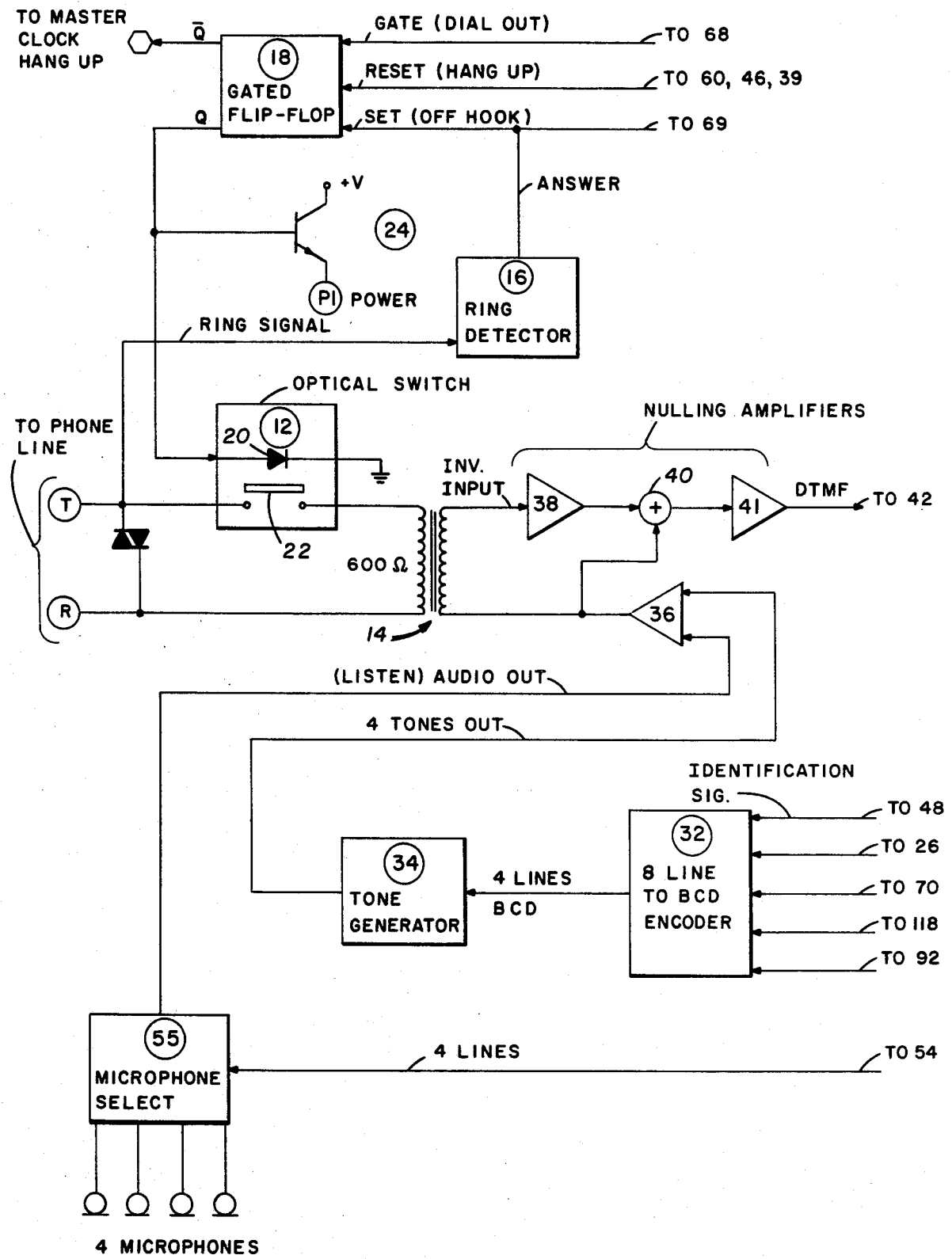
FIG. 1 is a block diagram of input and output portions of the remote security system.

The input and output portion of the remote security system is shown in FIG. 1 connected to typical telephone lines 10. To protect the system from voltage surges, a 300 V clamp can be placed between the telephone lines 10. The Federal Communication Commission requires the physical isolation of the system from the telephone lines 10, which is accomplished electromagnetically with an optical switch 12 and an input transformer 14. The optical switch 12 can comprise an LCA 110, and the input transformer 14 can be a TI Stancor TTPC-13 telecommunications transformer. When a user dials the system a ring signal occurs on the telephone lines 10, and the ring signal is detected by a ring detector 16 (e.g., TCM 1520) that generates an answer signal to a gated flip flop 18 (e.g., 74HCO2N). The answer signal sets the gated flip flop 18 to yield an on signal to a light emitting diode 20 of the optical switch 12. The diodes' light closes a switch 22, so current flows to the input transformer 14. The on signal of the gated flip flop 18 also triggers a power transistor 24, making available at P1 a voltage V+ to drive the system.

A deceiver ring circuit 26 (see FIG. 2) is turned on also by P1. The deceiver ring circuit 26 sends a deceive signal on one line of an eight line-to-binary coded decimal (BCD) encoder 32 (e.g., 4532), which encodes a BCD signal representing a telephone's ring signal and is output to a tone generator 34 (e.g., M991). The tone generator 34 produces tone signals as designated by AT&T, the ring signal being one, which are used throughout the telephone industry. The tone signal enters an amplifier 36, energizes the input transformer 14 and travels on the telephone lines 10 so the user hears a standard telephone "ring". When the user dials the system, the deceiver ring signal will be repeated until the user enters an appropriate code (discussed below) on the user's telephone push-buttons between the recurring deceive signal rings. However, when the system telephones the user on fault detection, the user's telephone will ring first, and on answering, the user will hear the system's deceive ring signal. The user, having answered the ringing telephone at the user's end and on hearing a remote telephone ringing on the other end, knows the system has dialed. The user then enters the appropriate code to determine which sensor of the system has detected a fault. The tone signal is also inverted in an inverting amplifier 38, and is summed at 40 with the noninverted tone signal to yield a nulled signal to the amplifier 41. The amplifiers 38, 40 and 41 are nulling amplifiers, provided to insure that system-generated tones do not enter the system, but travel to the user. Without inverting amplifier 38 and sum 40, a tone signal from the tone generator 34 would pass into the system, where the tone signal might be interpreted as an incoming user generated signal.

Once a user hears a "ring", a system code signal is entered on the push buttons of the user's telephone between successive rings. The system receives the code signal, which can be a series of tones, over the input transformer 14. The code signal is inverted by inverter amplifier 38 and amplified by amplifier 41. The code signal is not nulled or cancelled at sum 40 because there is no signal exiting amplifier 36.

Figure 2:
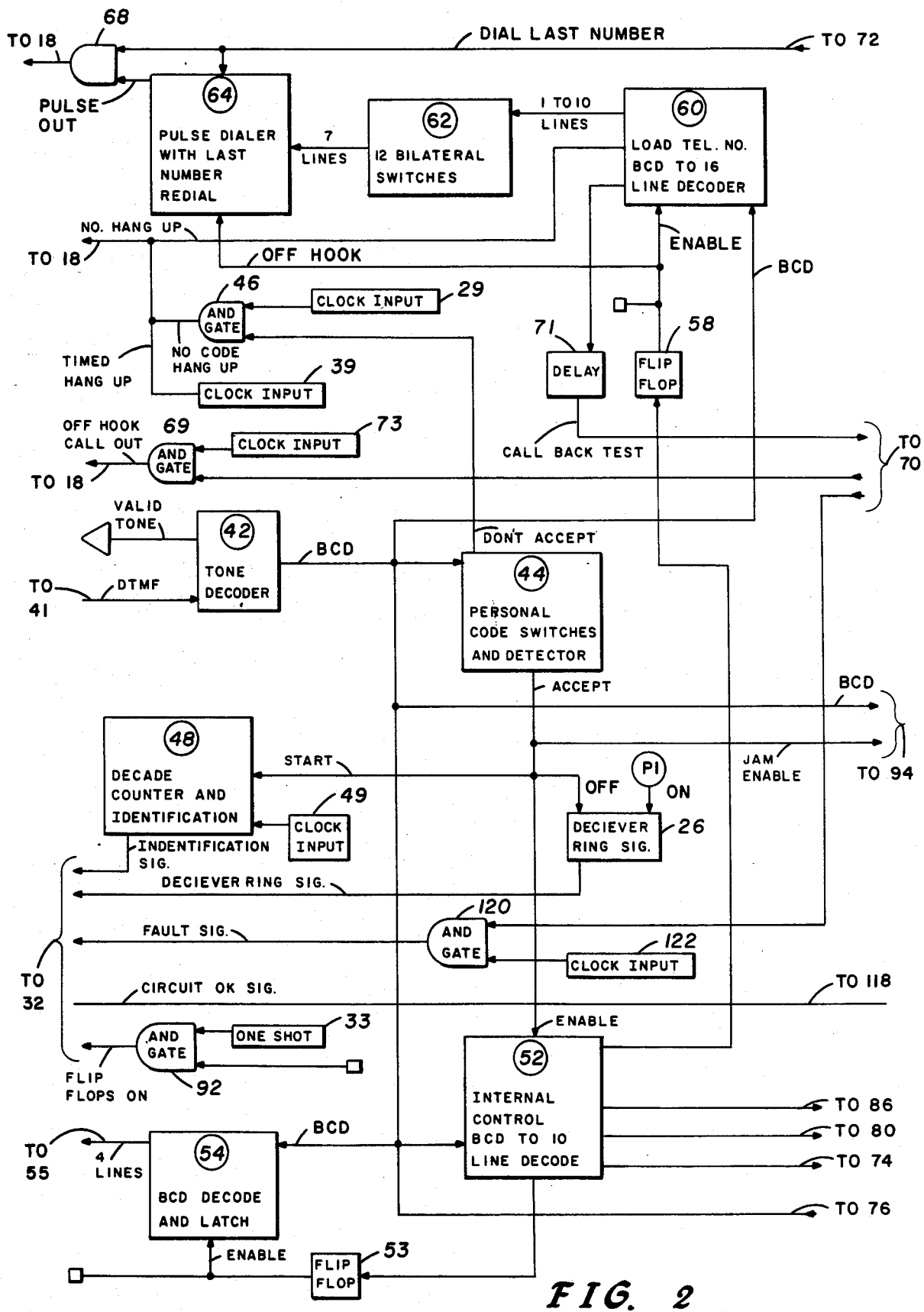
FIG. 2 is a block diagram of the code and command portions of the system.
Figure 3:
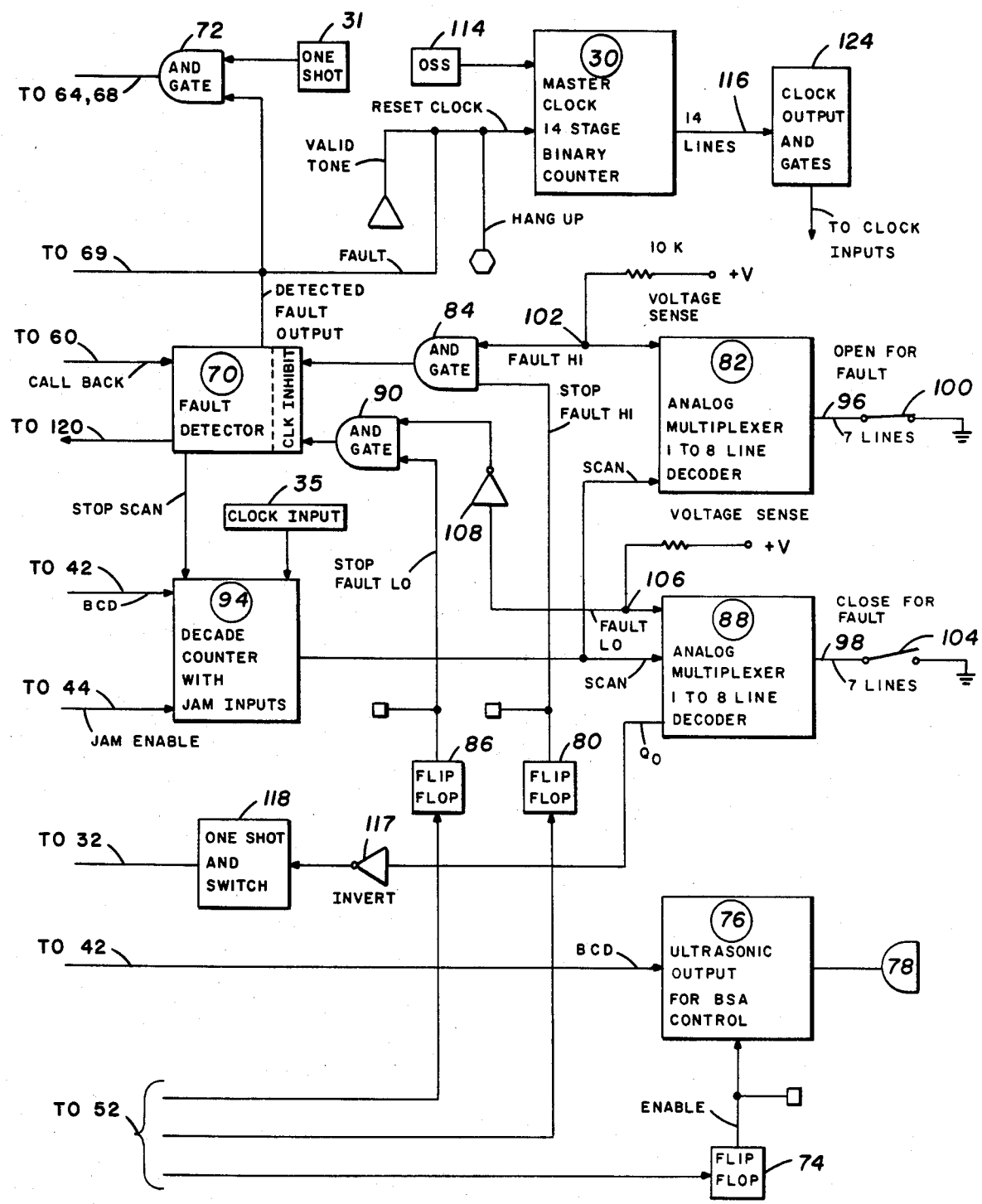
FIG. 3 is a block diagram of the system's fault detection portion.

In FIG. 2 the output of amplifier 41, the inverted code signal, is input to a tone decoder 42 (e.g., SS1202) which detects the tones comprising the code signal, and emits a BCD signal to a circuit of personal code switches and detector 44 (see FIG. 2) and a valid tone signal to reset a master clock 30 (see FIG. 3). The personal code switches and detector circuit 44 (e.g., 4028 and 4081) includes a 4-to-10 line decoder and four switches. Each of the four switches is physically set by the user to a given code digit. If a sequence of tones generated by the user corresponds to the switch settings, the system has received a correct code signal and circuit 44 generates an accept signal. Conversely, if the tones correspond to wrong settings, or occur in the wrong sequence, a do-not-accept signal is emitted from circuit 44, with a timed clock signal 29 in AND gate 46 to reset the gated flip flop 18 (see FIG. 1). The user pushing an incorrect code will hear the system disconnect or "hang-up" on the user. A three switch personal code and detector circuit is discussed in U.S. Pat. No. 4,493,947 to Loveless. However, the accept signal turns off the deceiver ring circuit 26 to cease the "ring" heard by the user, and to start a decade counter (e.g., 4017) with an identification digit switch 48. The identification switch 48 allows the user to identify communications from different systems located at different sites. For instance, one system may be located on a boat and another in a warehouse. As soon as the start signal is received by the decade counter portion with the identification switch 48, the counter is incremented by clock input 49 until a selected setting of a digit switch is pulsed. If the digit switch is set on "two", a two-burst signal, identifying the boat, for example, is received by the eight line-to-BCD encoder 32 (see FIG. 1) that drives the tone generator 34. Two bursts of the same tone, or two "beeps" are heard by the user. A system located in the warehouse could have a digit switch set for a four "beep" signal for instance to inform the user the warehouse system has called. Identifying beeps are heard when a system telephones the user with a detected fault. The user can telephone any system at any time for random checks by dialing the telephone number of a particular system, in which case the decade counter and switch 48 also generates identifying beeps which may be respected by pressing a selected pushbutton.

The accept signal also enables an internal control 52, a BCD-to-ten line decoder. Once enabled, the internal control 52 can accept BCD signals from the tone decoder 42, entered by the user via telephone push-buttons. According to the push-button pressed by the user, one line of the internal circuit 52 will yield an output. For instance, if the number eight of a telephone is pressed, an output of the internal control 52 will enable a BCD decoder via a flip flop 53, and latch 54 to activate a microphone select circuit 55 (e.g., CD 4066) of FIG. 1. Any one of four microphones 56 can be turned on so the user can listen to different areas of the user's boat or warehouse. Noises detected by the microphones are fed as analog audio signals to the amplifier 36 and over the input transformer 14 to the user. The analog audio signal is also inverted by inverter amplifier 38 for summing with the noninverted analog audio signal at sum 40. A nulled audio signal reaches the amplifier 41, so there is no reception of undesired audio tones by the tone decoder 42 of FIG. 2. The remaining output lines of the internal control 52 are connected to four flip flops which regulate other system functions. When the user presses the number 9, for instance on a telephone, a BCD signal is received by the internal control 52 to set flip-flop 58 that enables a load telephone number circuit 60, comprising a BCD-to-sixteen line decoder. Any individual tone signals originating from the tone decoder 42 will set twelve bilateral switches 62 arranged in a three-by-four matrix with a sevenline output. With this feature the user can enter a telephone number the system will dial on fault detection. The user going on vacation need not go to the warehouse for instance to change the system's dial-out number, but by entering correct commands and a new telephone number, can set the system to call the user at the new number. The new number is stored in a pulse dialer 64 with a last number redial feature (e.g., MK 50892). To check a newly loaded telephone number, the user presses a telephone "*" button to send a call back test signal to the fault detector 70 through a delay 71. The delay gives the user time to hang up before the call back is made. An artificial fault is set this way within the fault detector 70. The user then presses "" to give a hang-up or reset signal to the gated flip flop 18 from the BCD-to-sixteen line encoder 60. The system will then dial the user, due to the artificial fault (the call back test signal) sent from the BCD-to-sixteen line encoder 60. The hang-up feature may be used at any time by the user to cease commands or to deliberately restart the master clock 30. The flip flop 58 also sends a signal to an off-hook input of the pulse dialer 64. A signal at the off-hook input enables the pulse dialer 64 to accept a new telephone number from the twelve bilateral switches 62. The output of the pulse dialer 64 enters an AND gate 68 that also receives a command from the fault detector 70 (see FIG. 3) to dial the last entered number. When a sensor of the system detects a fault (e.g., intrusion, full bilge; discussed below). The fault detector 70 output is ANDed with a one shot 31 (for delay) in AND gate 72 to create the command to AND gate 68 and the pulse dialer 64 that outputs a dial-out signal to the gated flip flop 18. Because the optical switch 12 is gated on and off, the last number of the pulse dialer 64 is dialed over the telephone lines 10. Other functions of the fault detector 70 are discussed below.

The internal control 52 (FIG. 2) can also set a flip flop 74 to enable an ultrasonic output for a BSA control circuit 76. A BCD signal is received from the tone decoder 42 for generation by the control circuit 76 as an ultrasonic signal through speaker 78. With this feature, a user outside can operate a home lighting system through house wiring. The entire home may be lit and intrusion sensors checked before the homeowner enters, so the homeowner will not be surprised by burglars, for instance.

A flip flop 80 controls the operation of an analog multiplexer 82 (e.g., CD4051) through an AND gate 84. The output of the flip flop 80 is normally set high so a fault high signal (detailed below) is passed through the AND gate 84 to the fault detector 70. The pulse dialer 64, in response to the output of the fault detector 70, dials the stored telephone number as discussed above, while the master clock 30 is reset. Another flip flop 86 similarly controls another analog multiplexer 88. Here, a fault low signal (also detailed below) is inverted to yield a high input to an AND gate 90 which is passed to the fault detector 70 when flip flow 86 is set high. The fault detector 70 sends a fault output to an AND gate 69 which is combined with a clock input 73 to create an off hook call out signal. 0.2 second after the master clock 30 is reset, the system is connected to the telephone lines 10. The clock input 73 delays the off hook call out signal to get a dial tone for the system. The command to dial out from the AND gate 72 is delayed by the one shot 31 until after the dial tone.

All the flip flops 53, 58, 74, 80 and 86 are set or reset by the internal control 52. The status of each flip flop is indicated to the system user by audio feedback through an AND gate 92. All the flip flops 53, 88, 74, 80 and 86 are connected by steering diodes (not shown) in a common input to AND gate 92. A one shot 33 when ANDed at 92 with any set or high flip flop generates a frequency signal that is encoded in encoder 32 for generation as an audible tone through the tone generator 34, the tone indicating to the user that the flip flop is set.

A decade counter with jam inputs 94 (e.g., CD4029) receives the BCD signal from the tone decoder 42 and the accept signal from the personal code switches and detector circuit 44, which enables the decode counter 94. With the input of a clock signal (e.g., CD4011) 35, the decade counter 94 begins to count on a three line output (one shown) to scan both analog multiplexers 82, 88, putting a parallel test signal to each of seven output lines 96, 98 of the analog multiplexers 82, 88, respectively. The seven output lines 96 are each connected to normally closed switches 100 like those used in intrusion alarm systems. When any normally closed switch 100 is opened a voltage sense signal 102 is inhibited as an input to the analog multiplexer 82, sending the fault high signal to AND gate 84. If flip flop 80 is set high, AND gate 84 sends a clock inhibit signal to the decade counter 94, stopping the scan of the analog multiplexer 82 at the particular output line 96 that is open.

The analog multiplexer 88 has normally open switches 104 connected to the output lines 98, creating a high voltage at 106. If one of the switches 104, such as on a bilge pump, should close, the voltage at 106 goes low giving a fault low signal to inverter 108, which inverts the fault low signal. If flip flop 80 is set high, AND gate 90 will pass the inverted fault low signal to the fault detector 80.

The user can stop the scanning of either analog multiplexer 82, 88 by resetting the appropriate flip flop 80, 86. For instance, if a normally open switch 104 to the bilge pump closes, and the user is telephoned by the system, the user may reset flip flop 86 by pressing a selected push-button so the normally open switches 104 are no longer scanned. This allows the normally closed switches 100, for example, intrusion alarms, to be scanned until the bilge pump's switch 104 is returned to a normally open position (once the switch is checked, repaired, or the pump is operated).

During normal operation of the system, Qo, the output of the analog multiplexer 88, is high. The output Qo is a circuit OK signal that feeds to an inverter 117, to a one shot and switch 118 (e.g., 4098 and 4066), then to the encoder 32. When the decade counter 94 scans the analog multiplexers 82, 88 the high Qo signal is set low by the inverter 117 so the one shot and switch 118 is not pulsed. However, when a fault is detected the decade counter 94 receives an inhibit or stop scan command from the fault detector 70. The decade counter 94 ceases to increment, as do the analog multiplexers 82, 88. Qo goes low, is inverted at 117, to a high signal. The high output of inverter 117 fires the one shot to close the switch of 118. A short burst is provided to the encoder 32. The one shot and switch 118 insures the encoder is enabled after receiving a BCD count from the decade counter and identification circuit 48. The decade counter 94 also ceases to increment when the user dials the system, the user's code is accepted and a line check command is entered. The user, to check the status of a particular switch 100, 104 first sets flip flop 80, for instance, to stop any high fault signal at the analog multiplexer 82 and to test the low fault circuits of the analog multiplexer 88. The user then presses a telephone push-button (one to seven) corresponding to the seven normally open switches 104. By pressing a three, for instance, the user causes a BCD signal to be received by the decade counter 94, jamming the decade counter 94 at "three". Because the decade counter 94 is jammed, Qo goes low, is inverted high at 117. The inverted Qo signal passes the one shot and switch 118 as discussed before. The encoder 32 receives the circuit OK signal from AND gate 118 and the tone generator 34 sounds a "beep-beep", for example, indicating to the user that the system is functioning. If the third normally open switch 104, corresponding to the pressed "three" is open, the user only hears the circuit OK signal "beep-beep", because the check signal reached the analog multiplexer 88. Conversely, if the third switch 104 is closed the fault low signal triggers the fault detector 70 via AND gate 90. The fault detector 70 sends a signal to an AND gate 120 with a timed clock signal 122. The output of the AND gate 120 reaches the encoder 32 that drives the tone generator 34. The user hears a lower tone "boop-boop" (the circuit is OK and a fault is sensed at the third switch 104).

Each of the clock inputs 28, 29, 35 and 37 is derived from a master clock 30 which is a fourteen stage binary counter (e.g., CD 4060) driven by an oscillator 114. Fourteen lines 116 from the master clock 30 are combined by clock output AND gates 124 to derive the timing signals necessary for clock inputs 28, 29, 35 and 37. For instance, another clock input 39 of sixty seconds is used before the system disconnects or hangs-up if the user fails to answer or to punch appropriate codes. However, each correctly entered code from the user will reset the master clock. When the system detects a fault or valid tone, the master clock 30 is reset and the clock input 39 starts counting from zero, to give the user ample time to enter codes or commands. The system will redial when the user does not answer. To meet FCC requirements a counter can be included to count the number of redials to the user, and can be connected to cease all redials for ten minutes, for example.

Other modifications are apparent to those skilled in the art which do not depart from the scope of the invention as defined by the appended claims.

What is claimed is:

1. A remote security and operating system that communicates with a user through a telephone comprising:
   an input/output portion electromagnetically connecting the system to the telephone;
   a decoding means connected to the input/output portion for decoding tones entered into the system by the user and for accepting a code of sequential tones entered by the user and for sending a BCD signal;
   a fault means having;
      a sensor for generating a fault output and having:
      a tone generator for sending a fault tone through the telephone to the user on detection of a fault by the sensor;
   first and second multiplexers in parallel;
      a decade counter incremented by a clock signal and connected to scan the multiplexers, such multiplexers generating a circuit OK tone through the telephone to the user via the tone generator; and
      a switching means for ceasing the scan of the first and second multiplexers; and
   the system also comprising a control means connected to receive the BCD signal and to control the switching means with a set signal.

2. A system as in claim 1, the decade counter having a jam input that receives the BCD signal from the decoding means to stop further increment of the decade counter.

3. A system as in claim 2, including a pulse dialer means for storing a telephone number and sending a dial signal to the input/output portion representing the telephone number which the system connects over the telephone lines, the pulse dialer means also connected to the fault means for receiving the fault output that causes the pulse dialer means to send the dial signal.

4. A system as in claim 3, including a BCD decoder means, connected to receive the BCD signal from the decoding means and the set signal from the control means, for loading of a new telephone number the system is to connect on fault detection; the fault means connected for receiving a call back signal form the BCD decoder means that simulates a detected fault, causing the fault means to generate the fault signal to the pulse dialer means.

5. A system as in claim 4, including a matrix means of bilateral switches between the BCD decoder means and the pulse dialer means, for taking the loaded new telephone number and storing the telephone number in the pulse dialer.

6. A system as in claim 5, the input/output portion having a nulling means, receiving the fault and circuit OK tones from the tone generator, for nulling the tones to prevent input of the tones to the decoding means.

7. A system as in claim 6, including an identification circuit having a digital switch, the decoding means sending an accept signal to the identification circuit that outputs a series of bursts to the tone generator.

8. A system as in claim 7, including a first setting means, connected to receive the set signal from the control means, for ceasing the scan of either of the first and second multiplexers.

9. A system as in claim 8, including a second setting means, connected to receive the set signal, for enabling the BCD decoder and pulse dialer.

10. A system as in claim 9, including a microphone connected to a third setting means that receives the set signal, for enabling the microphone which transmits an audio signal to the nulling means.

11. A system as in claim 10, including an ultrasonic means for generating an ultrasonic output, connected to a fourth setting means that receives the set signal for enabling the ultrasonic means.

12. A system as in claim 11, the input/output portion including: a transformer coupling the nulling means to the telephone lines; a gating means connected to the pulse dialer means, the decoding means and the fault means; and an optical switch connected to the gating means and the telephone lines.

* * * * *